United States Patent [19]

Yamada

[11] Patent Number: 4,941,188
[45] Date of Patent: Jul. 10, 1990

[54] IMAGE SIGNAL PROCESSING APPARATUS

[75] Inventor: Masanori Yamada, Kawasaki, Japan

[73] Assignee: Canon Kabushiki Kaisha, Tokyo, Japan

[21] Appl. No.: 289,520

[22] Filed: Dec. 27, 1988

Related U.S. Application Data

[63] Continuation of Ser. No. 597,735, Apr. 6, 1984, abandoned.

[30] Foreign Application Priority Data

Dec. 4, 1983 [JP] Japan ................................ 58-63013
Dec. 4, 1983 [JP] Japan ................................ 58-63859

[51] Int. Cl.$^5$ .............................................. G06K 9/38
[52] U.S. Cl. .......................................... 382/50; 382/53
[58] Field of Search .................................... 382/50–53; 358/282, 284

[56] References Cited

U.S. PATENT DOCUMENTS

| | | | |
|---|---|---|---|
| 4,064,484 | 12/1977 | Mese et al. | 382/53 |
| 4,234,895 | 11/1980 | Sommer | 358/282 |
| 4,272,789 | 6/1981 | Biron | 358/282 |
| 4,315,285 | 2/1982 | Sommer | 358/280 |
| 4,402,015 | 8/1983 | Yamada | 358/284 |
| 4,420,742 | 12/1983 | Tadauchi et al. | 358/282 |
| 4,446,486 | 5/1984 | Itoh | 382/53 |
| 4,468,703 | 8/1984 | Fujiwara et al. | 358/382 |
| 4,556,916 | 12/1985 | Matsunawa | 358/282 |
| 4,562,486 | 12/1985 | Suzuki et al. | 382/53 |
| 4,575,768 | 3/1986 | Sakai et al. | 358/282 |
| 4,594,733 | 1/1986 | Kanzaki et al. | 358/282 |

FOREIGN PATENT DOCUMENTS 3413651 10/1984 Fed. Rep. of Germany ...... 358/282

OTHER PUBLICATIONS

"Adaptive Productive Coding for Newspaper Facsimile" by Usubuchi et al., Proceedings of the IEEE, vol. 68, No. 7, Jul. 1980, pp. 807–813.
Digital Image Processing by William K. Pratt, John Wiley & Sons, N.Y., 1978, pp. 644–657.

*Primary Examiner*—Leo H. Boudreau
*Assistant Examiner*—Jose L. Couso
*Attorney, Agent, or Firm*—Fitzpatrick, Cella, Harper & Scinto

[57] ABSTRACT

An image signal processing apparatus has an optical system including an image sensor, a comparator for comparing the density level of a current line with that of a previous line as a predicted value, a CPU for determining a threshold level in a different mode in accordance with the result obtained by the comparator, and another comparator for comparing the current image signal with the threshold value from the CPU to produce a binary encoded signal. The apparatus properly discriminates background and information portions of an original image and performs binary encoding of image signals in real time without requiring a large-capacity memory.

10 Claims, 7 Drawing Sheets

IMAGE SIGNAL PROCESSING APPARATUS

This application is a continuation of application Ser. No. 597,735, filed Apr. 6, 1984, now abandoned.

BACKGROUND OF THE INVENTION

1. Field of the Invention

The present invention relates to an apparatus for performing binary encoding or quantizing of image signals.

2. Description of the Prior Art

One conventional system for binary encoding of image signals is known in which image signals read from an original are binary encoded in accordance with a fixed threshold level. However, with this system, it is frequently impossible to separate a background portion and a data portion of an original.

Another conventional system is also known in which an original is scanned preliminarily to statistically determine a threshold level and image signals obtained in actual scanning are processed in accordance with the determined threshold level. However, this system requires scanning of a single original twice, resulting in time-consuming operations.

When the threshold level is statistically calculated and determined, if the threshold level is determined for performing binary encoding of all types of image signals which may be encountered, some portions of originals may be skipped and cannot be processed.

SUMMARY OF THE INVENTION

The present invention has been made in consideration of this and has as its object to provide an image signal processing apparatus which is capable of performing binary encoding suitable for any type of original.

It is another object of the present invention to provide an image signal processing apparatus which is capable of performing binary encoding of image signals without requiring preliminary scanning of an original.

It is still another object of the present invention to provide an image signal processing apparatus which is capable of performing binary encoding of image signals without requiring a large-capacity memory.

It is still another object of the present invention to provide an image signal processing apparatus which is capable of performing binary encoding of image signals in real time.

It is still another object of the present invention to provide an image signal processing apparatus which is capable of performing binary encoding of image signals by predicting the background density level of a line to be binary encoded in accordance with the background density level of a preceding line.

It is still another object of the present invention to provide an image signal processing apparatus which is capable of performing binary encoding in different modes in accordance with the background density level of a line to be binary The above and other objects and features of the present invention will become apparent from the following detailed description taken in conjunction with the accompanying drawings.

DETAILED DESCRIPTION OF THE PREFERRED EMBODIMENTS

The preferred embodiment of the present invention will now be described with reference to the accompanying drawings.

Figure 1:
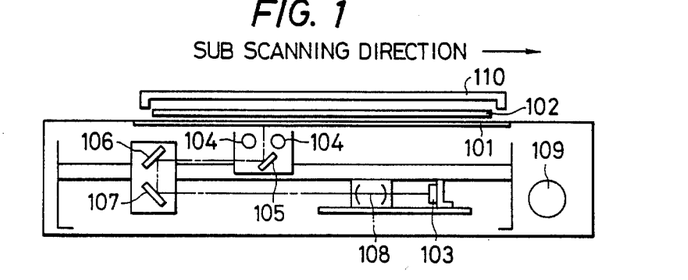
FIG. 1 is a schematic view showing an original reader to which the present invention is applied.

FIG. 1 is a schematic view showing an original reader to which the present invention is applied. An original 102 is placed on an original table 101 and is held in place by an original cover 110. In order to read image information on the original 102, light from a light source 104 is reflected by a surface of the original 102 and an image is formed on an image sensor 103 through mirrors 105, 106 and 107 and a lens 108.

The set of the light source 104 and the mirror 105 and the set of the mirrors 106 and 107 are moved at a relative speed ratio of 2:1. The light source unit is displaced from left to right at a constant speed by a DC servo motor 109 under the control of a PLL (phase locked loop). In the forward movement of the light source unit, the travel speed may be changed within the range of 90 mm/sec (200%) to 360 mm/sec (50%) in accordance with the required reproduction multiplication factor. However, in the return movement of the light source, the travel speed is fixed at 630 mm/sec.

The main scanning lines perpendicular to the sub scanning direction along which the optical unit moves are read by the image sensor 103 at a resolution of 16 pel/mm. After the optical unit is moved from the left end to the right end, it is moved back from the right end to the left end, thereby completing one scanning operation.

Figure 2:
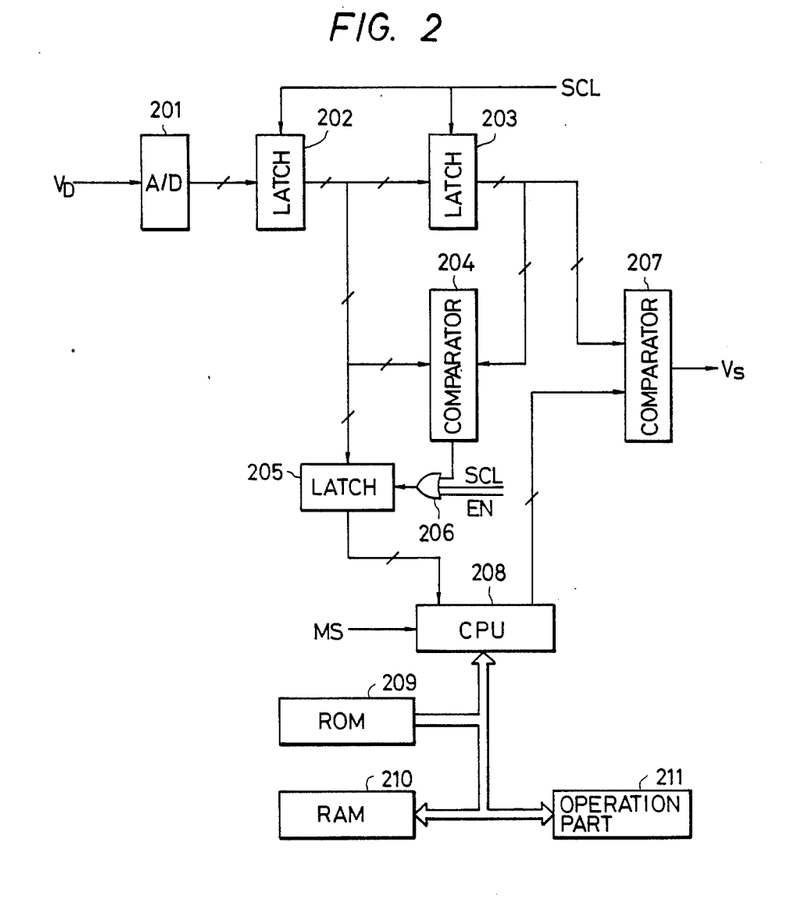
FIG. 2 is a schematic block diagram of an image signal processing circuit.

FIG. 2 shows a schematic block diagram of a circuit for processing image signals from the image sensor 103. Image signals $V_D$ from the image sensor 103 are supplied to an A/D converter 201 to be converted into 6-bit digital signals. The digital signals are supplied to a latch 203, a comparator 204 and a latch 205 through a latch 202 in synchronism with a sampling clock SCL. The comparator 204 compares the current 6-bit image signal supplied from the latch 202 with the immediately preceding 6-bit image signal supplied from the latch 203. If the image signal supplied from the latch 202 is smaller than the other, the comparator 204 supplies an output to a first input terminal of a 3-input AND gate 206. The AND gate 206 supplies the comparison output from the comparator 204 to the latch 205 in synchronism with the sampling clock SCL. Upon reception of the comparison output, the latch 205 supplies the image signal supplied from the latch 202 to a CPU 208. Note that a second input terminal of the AND gate 206 receives the sampling clock SCL and a third input terminal thereof receives an enable signal EN representing an effective period of the image signal received from the image sensor 103. In this manner, the comparison output of the image signals is supplied from the latch 205 to the CPU 208 within a predetermined period of main scanning lines. In response to a main scanning line sync signal MS, the CPU 208 fetches the image signal from the latch 205 so as to detect the lowest density level of each main scanning line, that is, the background level.

If the surface of the original cover 110 which faces the original table is black or is polished to provide a mirror effect, the image signal portion which does not correspond to the original becomes black and is not detected as the background level. Therefore, the enable signal EN can be used to determine the maximum main scanning width. If there is a possibility of detecting a portion which is not the original to be white, such as a conveyor belt or the like, as in the case wherein a DF or an ADF is mounted, the enable signal EN is limited to the minimum paper size.

Based on the background level detected, the CPU 208 determines the threshold level for each main scanning line in accordance with an algorithm to be described later. Then, the CPU 208 supplies the threshold level to a comparator 207 in synchronism with the main scanning line sync signal MS. The comparator 207 compares the image signal from the latch 203 with the threshold level from the CPU 208, and produces a consequent binary encoded signal $V_S$. As has been described above, each pel level after A/D conversion consists of 6-bits. Therefore, each pel level is given by 3F(HEX) for the darkest image portion and is given by 0 for the white image portion. Similarly, the threshold level and background level of each main scanning line are also given to fall within the range of 0 to 3F (HEX).

A ROM 209 stores therein an algorithm to be described later. A RAM 210 stores a control program.

Figure 3:
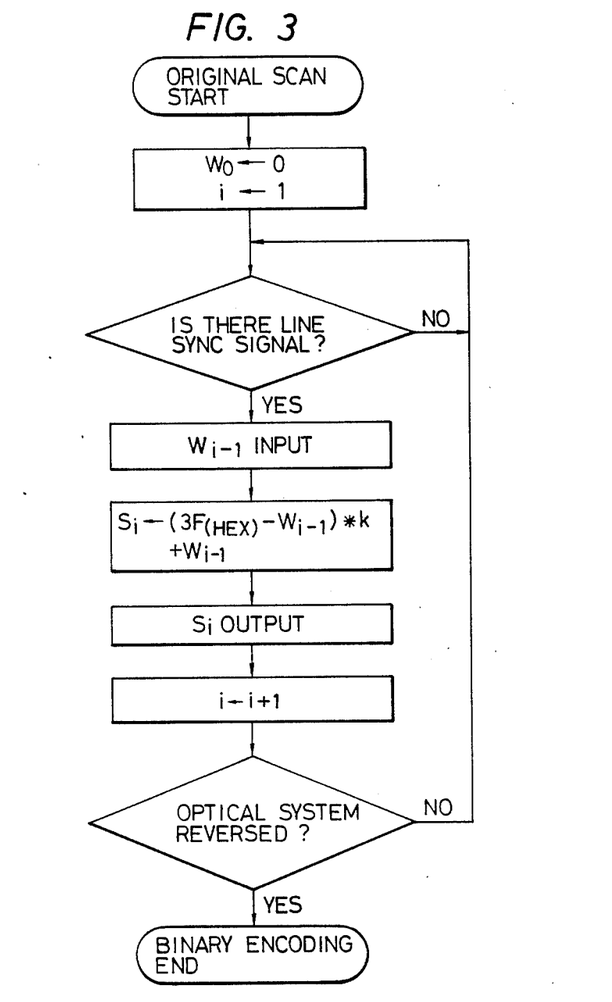
FIG. 3 is a flow chart showing the control sequence of a first embodiment of the present invention.
Figure 4:
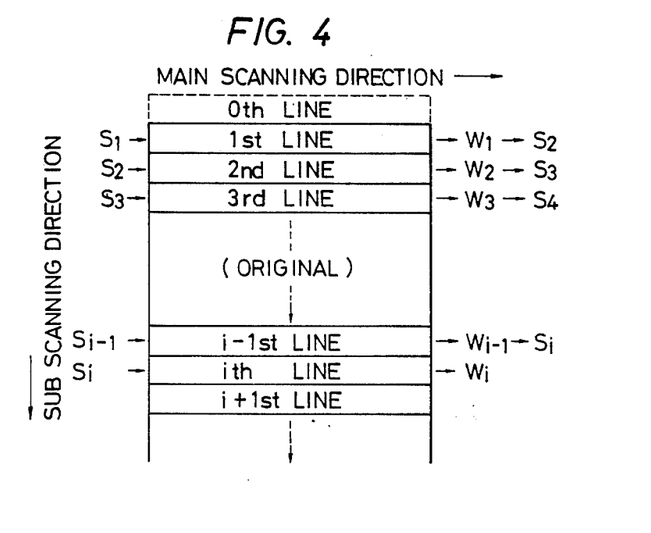
FIG. 4 is a representation for explaining the first embodiment of the present invention.

A description will now be made referring to FIGS. 3 and 4 of an algorithm for properly changing the threshold level of a given main scanning line in accordance with the background level. In the description to follow, $W_i$ represents the background level for the ith main scanning line, and $S_i$ is the threshold level for binary encoding for this ith main scanning line.

When the optical system starts moving to scan the original, the CPU 208 first produces $S_1 = [3F(HEX) - W_0] \times k + W_0$ (where k is an experimentally determined coefficient and satisfies $0 < k < 1$), as the threshold level for binary encoding of the first line.

Since no previous image information is provided in the case of the first line, the background level for an imaginary 0th line is given as $W_0$.

In an actual original, since there is usually no image information in an area having a width of at least several millimeters from the edge of the original, the assumption $W_0 = 0$ is reasonable.

When the distal end (first line) of the original has been binary encoded in accordance with the threshold level $S_1$, the CPU 208 fetches the background level $W_1$ of the first line in synchronism with the line sync signal, and produces $S_2 = [3F(HEX) - W_1] \times k + W_1$ as a threshold level for binary encoding of the second line.

Likewise, binary encoding of an ith line is performed in accordance with a threshold level $S_i = [3F(HEX) - W_{i-1}] \times k + W_{i-1}$. Such binary encoding is continued until the optical system reaches the right end of the original upon completing scanning thereof.

In this manner, the background level of the (i−1)th line is used as a predicted value of the background level of the ith line. Binary encoding is performed by determining a threshold level such that the threshold level falls within a range from white background level to black level of 3F(HEX). With this method, a threshold level can be properly updated in accordance with a change in the density of the background level, so that the background portion can be detected to be white and can be discriminated from the information portion. This obviates the need for preliminary scanning and for a memory for storing image signals.

Figure 5:
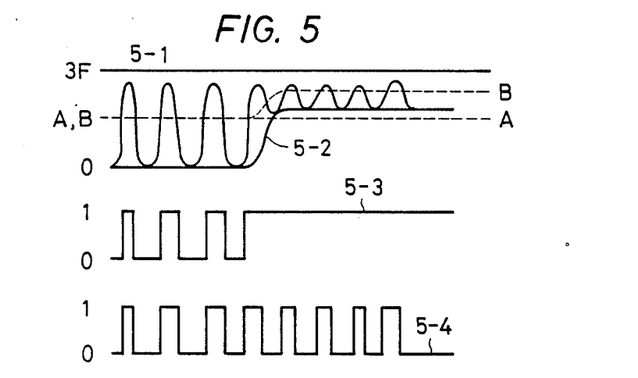
FIG. 5 is a chart showing the binary encoding process of image signals in accordance with a threshold level.

FIG. 5 shows the difference between binary encoded signals which are obtained in accordance with a threshold level B which is updated in accordance with changes in the density of the background of the original, and with a fixed threshold level A. In FIG. 5, 5-1 represents an image signal; 5-2, a background level; 5-3, a binary encoded signal based on the threshold level A; and 5-4, a binary encoded signal based on the threshold level B.

When the fixed threshold level A [=3F/2 =1F(HEX)] is used, the background portion and information portion cannot be discriminated at a portion of the original which has a high background level. However, when the threshold level B which is determined by $S_i = (3F_H - W_{i-1})/2 + W_{i-1}$ is used, the background portion and information portion can be discriminated even at a dark portion of the original.

Another embodiment of the present invention will now be described with reference to FIGS. 6 and 7. In this embodiment, based on the background level of each of a plurality of lines (N lines) immediately preceding a target main scanning line, the background level of the target main scanning line is predicted. The threshold level for this target main scanning line is determined based on this predicted background level.

First, an average value is calculated of (n−2) background levels selected from n background levels so as to exclude the maximum and minimum levels for the (i−n)th lines to (i−1)th lines immediately preceding the target main scanning line (ith line). The average value is given as a predicted value $W_i^*$ of the background level of the target ith line.

Using this predicted value $W_i^*$, the threshold level Si of the ith line is calculated according to:

$$Si = [3F(HEX) - W_i^*] * k + W_i^*$$

where k is an experimentally determined coefficient and satisfies $0 < k < 1$. Thus, assuming the predicted background level $W_i^*$ as white, the background and information portions of an image can be separated.

Figure 6:
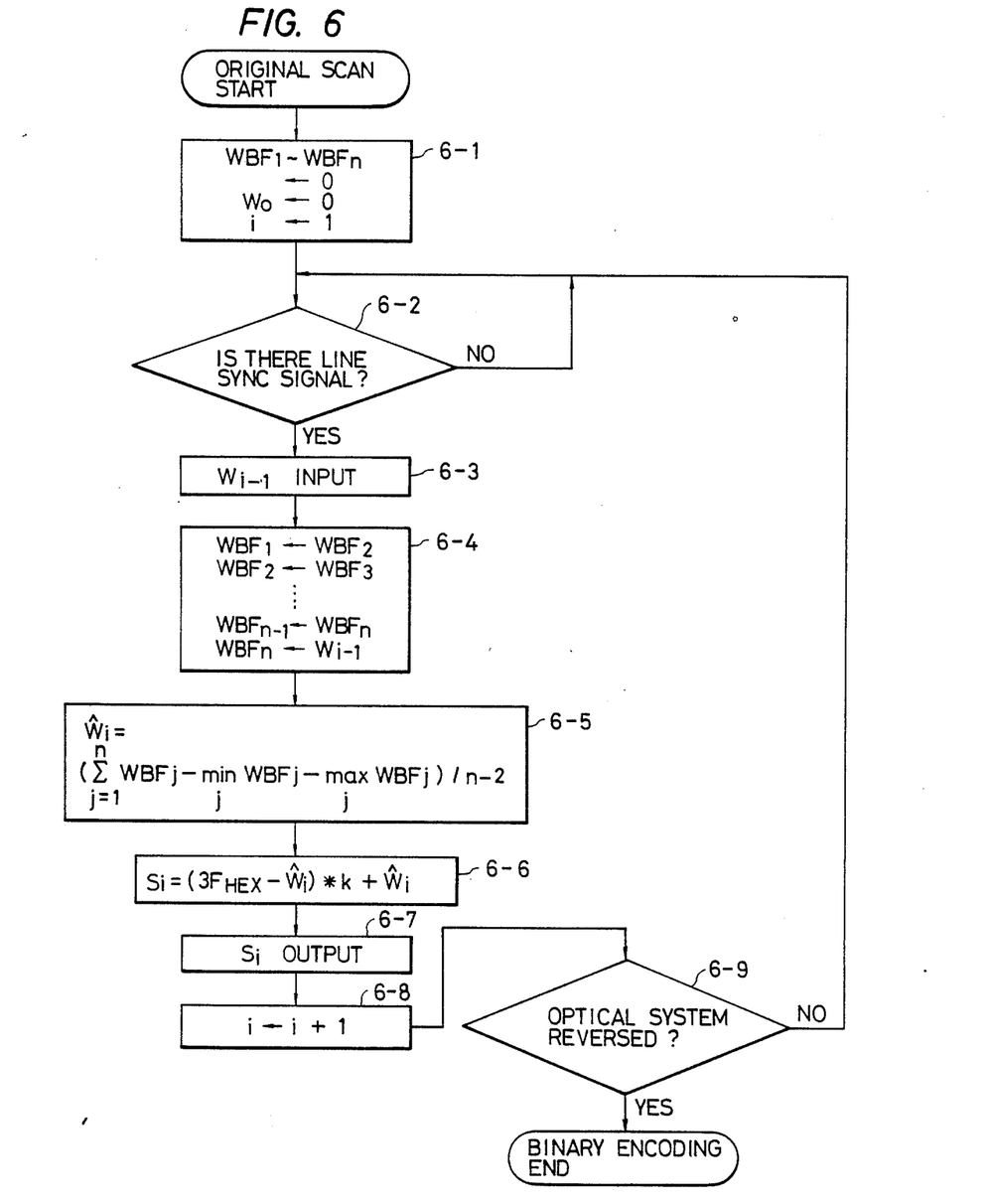
FIG. 6 is a flow chart showing the control sequence of a second embodiment of the present invention.

FIG. 6 is a flow chart showing the control sequence for the above operation. In order to store n background levels, areas $WBF_1$ to $WBF_n$ are set in the RAM 210. When original scanning is started, the value 0 is set in these n areas (step 6-1). Thus, the background levels of n imaginary lines prior to the first line are set.

$W_0$ is set in response to the line sync signal of the first line (steps 6-2 and 6-3). The oldest data in area $WBF_1$ among the data stored in the n areas is cancelled, the remaining data in areas $WBF_2$, $WBF_3$, ..., $WBF_n$ are shifted toward the older data by one data, and the newest data $W_0$ is stored in the area $WBF_n$ (step 6-4).

Based on the n data stored in areas $WBF_1$ to $WBF_n$, the value $W_i^\wedge$ is calculated, and $S_i$ is calculated therefrom (steps 6-5 and 6-6).

In a similar manner, the data in the areas $WBF_1$ to $WBF_n$ are updated for each line, and the threshold levels are also updated in the order of $S_2$, $S_3$, and so on (steps 6-7 and 6-8). Binary encoding is thus performed. When the optical system reaches the right end of the original, binary encoding is ended (step 6-9).

Figure 7:
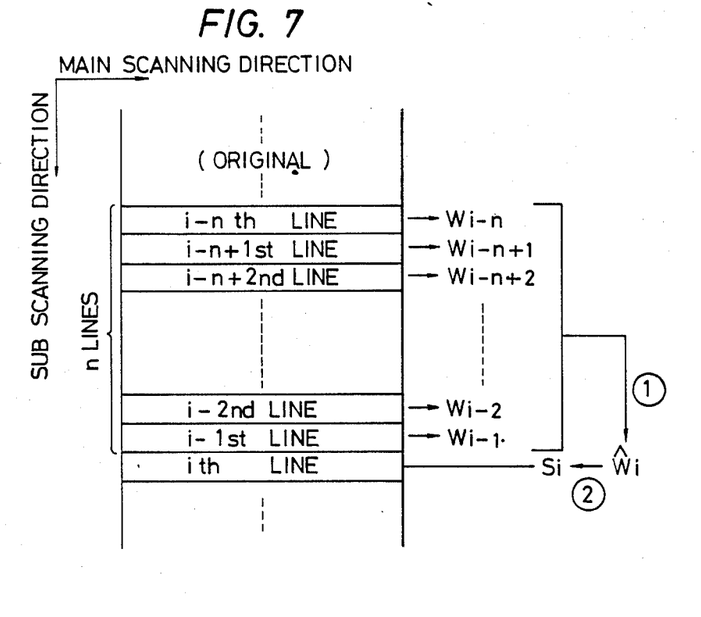
FIG. 7 is a representation for explaining the second embodiment of the present invention.

Referring to FIG. 7, we have:

$$W_i^\wedge = \left( \sum_{j=1}^{n} W_{i-j} - \max_j W_{i-j} - \min_j W_{i-j} \right) / n - 2 \quad (1)$$

$$S_i = [3F(HEX) - W_i^\wedge] * k + W_i^\wedge \quad (2)$$

Subsequently, based on the background levels of the N lines preceding the target main scanning line, the background level of the target main scanning line is predicted. The obtained predicted value is compared with a predetermined value. The threshold level is then determined in a different mode in accordance with the comparison result. An algorithm for this will be described below.

Figure 9:
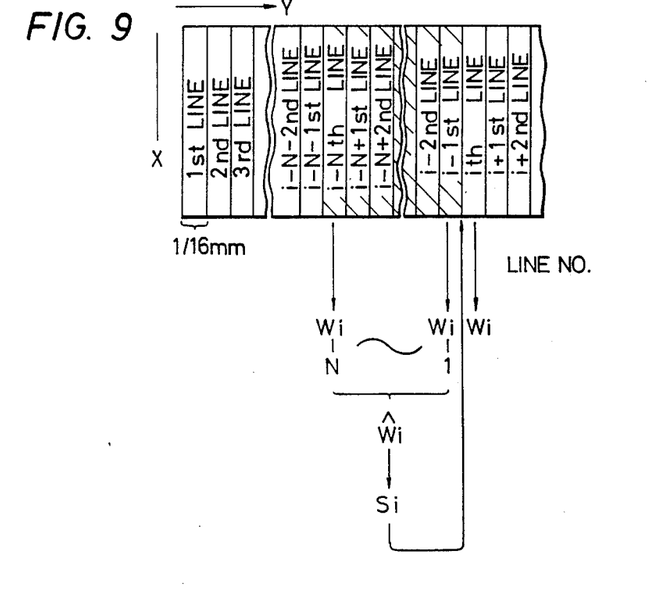
FIG. 9 shows the procedures for determining the threshold level of the ith line.

The basic principle for this will be described with reference to FIG. 9. When scanning of the (i−1)th line is completed, prior to scanning of the ith line, a predicted value $W_i^\wedge$ of the background level of the ith line is calculated in accordance with N background levels $W_{i-k}$, $R=1, ..., N$ of the (i-N)th line to the (i−1)th line. The predicted value $W_i^\wedge$ is compared with a predetermined value P. If $W_i^\wedge < P$, the threshold level $S_i$ of the ith line is calculated in accordance with the predicted value $W_i^\wedge$. When scanning of the ith line is commenced, the image signal is binary encoded in accordance with this threshold level $S_i$. At the same time, the background level of the ith line is determined. On the other hand, if $W_i^\wedge \geq P$, the threshold level $S_i$ is kept at a contant value irrespective of the predicted value $W_i^\wedge$.

Figure 8:
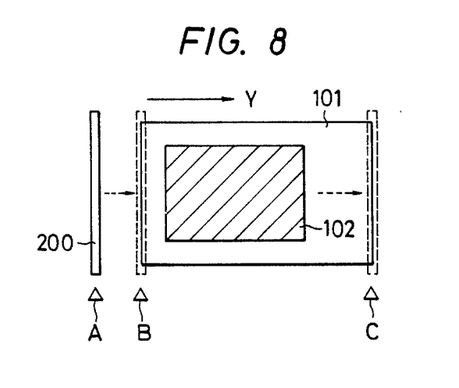
FIG. 8 is a representation showing the positional relationship between an original table and an optical system.
Figure 10:
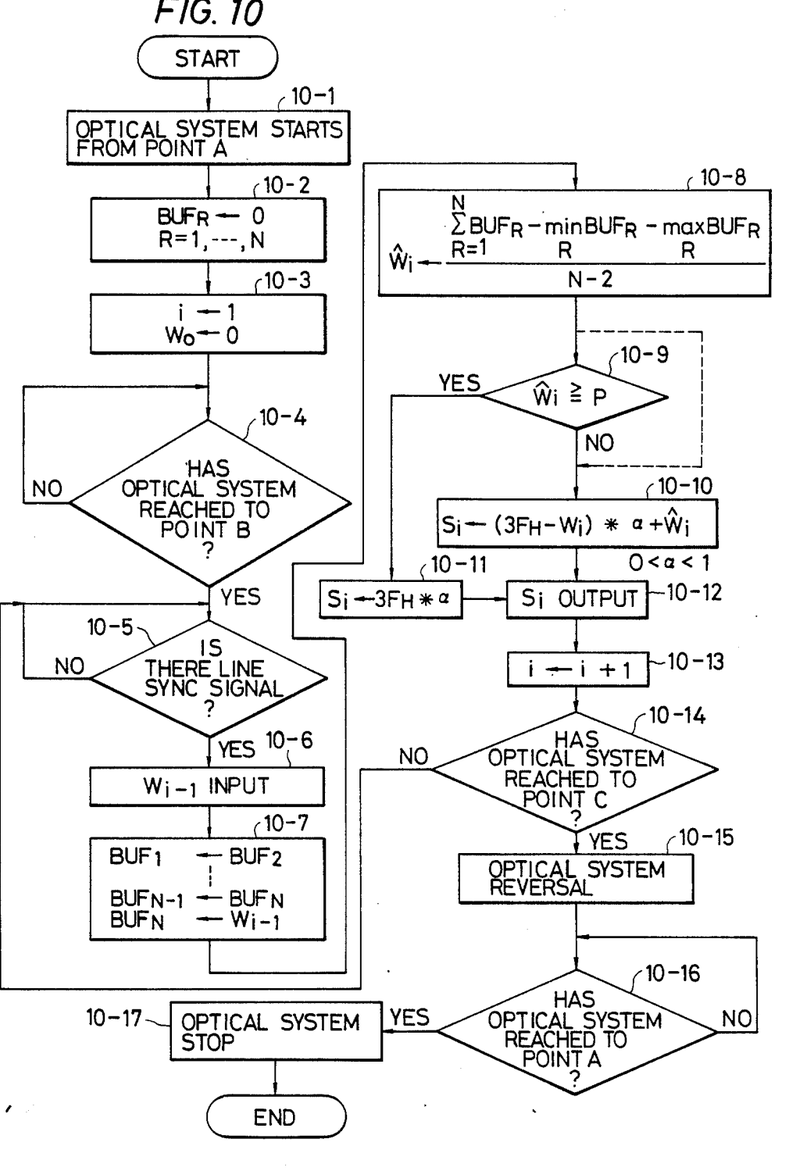
FIG. 10 is a flow chart showing the control sequence of a third embodiment of the present invention.

The flow sequence for this operation will be described with reference to the flow chart shown in FIG. 10 and the representation shown in FIG. 8.

In steps 10-1 to 10-4, initialization of steps 10-2 and 10-3 is performed during a time interval wherein the optical system 200 starts moving in the forward direction from its home position A and reaches image distal end point B. More specifically, data in areas $BUF_1$ to $BUF_N$ of the N-byte RAM 210 storing the N background levels preceding the target main scanning line is cleared. After it is determined in step 10-4 that the optical system 200 has reached the point B, every time it is determined in step 10-5 that the main scanning line sync signal is received, the background level of the immediately preceding line is fetched in step 10-6. In step 10-7, the oldest background data stored in the area $BUF_1$ is cancelled. The data in the areas $BUF_j$ to $BUF_{N-1}$ are shifted and the fetched newest data is stored in the area $BUF_N$. Upon this operation, the updated N background level data are stored in the areas $BUF_1$ to $BUF_N$. In step 10-8, in order to remove specific data from among the N background level data, the maximum and minimum values are removed. The remaining (N−2) data are averaged, and the obtained average value is provided as a predicted value $W_i^\wedge$ of the background level of the target main scanning line. In other words, a calculation in accordance with the following equation is performed:

$$W_i^\wedge = \left( \sum_{j=1}^{n} W_{i-j} - \max_j W_{i-j} - \min_j W_{i-j} \right) / N - 2$$

If it is determined in step 10-9 that $W_i^\wedge$ does not exceed the predetermined value P, the flow advances to step 10-10 wherein the threshold level is determined in a first mode. In the first mode, the threshold level $S_i$ is calculated in accordance with the calculation equation:

$$S_i = (3F_H - W_i) * \alpha + W_i$$

such that the predicted background level $W_i$ becomes white (where $\alpha$ is a coefficient for obtaining a threshold level which is an internally dividing point of a predetermined dividing ratio between the black level $3F_H$ and the background level $W_i$, and $\alpha$ satisfies the condition $0 < \alpha < 1$ and is experimentally determined to be, for example, ½). However, if the predicted background level $W_i$ exceeds the predetermined value P, the flow advances to step 10-11 wherein the threshold level is determined in a second mode. In the second mode, the threshold level is determined to be a threshold level $S_i = 3F_H * \alpha$ corresponding to a background level of 0. The coefficient $\alpha$ can be set to take any of the values 1/10, 2/10, ..., 9/10 in accordance with the preset density which is preset by an operator by means of a density lever (not shown) at an operation part 211 (FIG. 2).

The threshold level which is determined in this manner is produced in step 10-12, and i is incremented by one in step 10-13. Until it is determined in step 10-14 that the optical system has reached reversal point C, steps 10-5 to 10-13 are repeated.

When it is determined that the optical system has reached the reversal point C, the travel direction of the optical system 200 is reversed in steps 10-15 to 10-17. When the optical system 200 then reaches the home position A, the movement of the optical system 200 is ended.

In the embodiment described above, the actual detection data is stored in the areas $BUF_i$ for the (N+1)th line and thereafter. However, for the first to Nth lines, as in steps 10-2 and 10-3, N imaginary lines having a background level of 0 are assumed to exist prior to the first line, the threshold level for such imaginary lines is calculated, and binary encoding of the image signals of some initial lines is performed in accordance with the background level thus obtained When it is assumed that N=16, binary encoding of the image signals of the first 16 lines is performed in accordance with the imaginary data. A resolution of 16 pels corresponds to 1 mm. Therefore, an area 1 mm away from the edge of an actual original can be assumed to be a blank portion and to have a background level of 0.

With the control sequence as described above, the background and information portions of an original image can be discriminated even if the background level changes considerably, as shown in FIG. 5-2. When binary encoding of an image signal $V_D$ is performed for an original wherein the background level W changes considerably as shown in FIG. 5-3, the background and information portions cannot be discriminated satisfactorily in accordance with the fixed threshold level $A = (3F_H - 0) \times \frac{1}{2}$. However, when the image signal $V_D$ is binary encoded in accordance with the threshold level $B=(3F_H \times W) \times \frac{1}{2} + W$ which follows changes in the background level W, the background portion can be discriminated from the information portion as shown in FIG. 5-4.

Figures 11A, 11B, 11C:
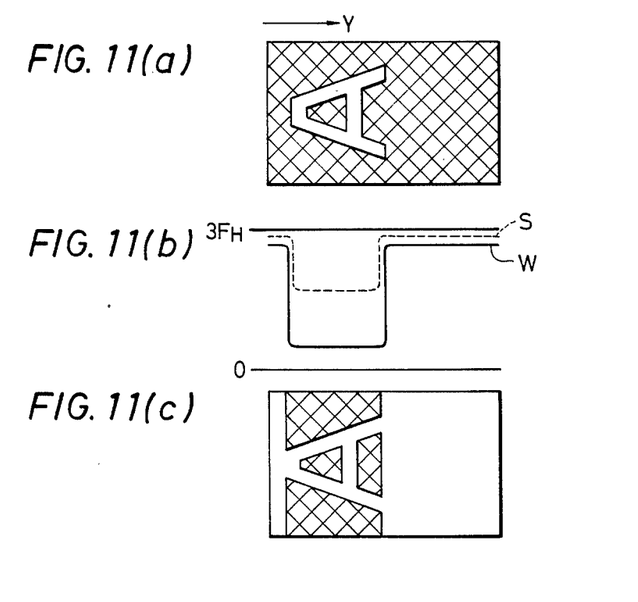
FIGS. 11(a), 11(b) and 11(c) are schematic representations showing an example of binary encoding of an original having a solid black portion.

In the case of an original having a reverse character image as shown in FIG. 11(a), when the image signal is binary encoded by allowing the threshold level to follow changes in the background level, the background level W and the threshold level S are determined as shown in FIG. 11(b). Accordingly, in an area wherein only the black level is present in the main scanning direction as shown in FIG. 11(c), this area is encoded as a white image.

In order to prevent this problem, in accordance with the embodiment of the present invention, if the predicted background level exceeds a predetermined value, it is assumed that the white level is not present and the black level alone is present throughout the corresponding main scanning line. Then, in order to encode this portion as a black portion, the threshold level for a background level of 0 is produced.

In this manner, in accordance with the embodiment described above, a simple circuit is incorporated so as to detect the background density levels of the respective main scanning lines. The background level of a target main scanning line is predicted in accordance with the background levels of the N immediately preceding lines. The threshold level is determined in order to set this predicted background level to correspond to white. If the background level of the target main scanning line is determined to exceed a predetermined value (darker), the threshold level is determined such that this predicted background level corresponds to black. Accordingly, binary encoding suitable for any type of original including a solid black image can be performed. The image signal processing apparatus of the present invention does not require preliminary scanning or an image signal storage memory, and allows suitable control with simple hardware and software.

In the embodiment described above, the threshold level is determined in accordance with N background levels. However, it is in fact possible to determine the threshold level in accordance with the condition $N=1$, that is, from the main scanning line immediately preceding the target main scanning line.

Furthermore, in the embodiment described above, the background level of the target main scanning line is determined in accordance with the background level or levels of a line or lines preceding the target line. However, the present invention is not limited to this. For example, the threshold level can be calculated in accordance with the read image signal while the image signal is stored in a memory. Finally, preliminary scanning of an original can be performed to determine the threshold levels of the respective lines.

What is claimed is:

1. An image signal processing apparatus comprising:
   reading means for reading an original image in units of lines;
   detecting means for detecting the peak density level of each line read by said reading means and for outputting peak density level data;
   storage means for storing plural lines of peak density level data detected by said detecting means; and
   processing means for performing an arithmetic operation on the plural lines of peak density level data stored in said storage means, and for performing density correction processing of a target line in accordance with an arithmetic operation result of the arithmetic operation, said processing means performing the density correction processing of the target line, and detection of the plural lines of peak density level data prior to the target line, during a one time reading operation of the original image by said reading means.

2. An apparatus according to claim 1, wherein said processing means performs binary encoding of an image signal representative of the target line.

3. An apparatus according to claim 2, wherein said processing means determines a threshold level in accordance with the arithmetic operation result and performs binary encoding of the image signal of the target line in accordance with the threshold level.

4. An apparatus according to claim 3, wherein said processing means determines the threshold level in accordance with an average value of the peak density levels of the plurality of lines excluding a specific peak density level.

5. An apparatus according to claim 4, wherein the specific peak density level includes maximum and minimum values of the peak density levels of the plurality of lines.

6. An apparatus according to any one of claims 1, 3 or 5, wherein the peak density level is a background density level.

7. An image signal processing apparatus comprising:
   reading means for reading an original image in units of lines;
   detecting means for detecting a peak density level of each line read by said reading means and for outputting peak density level data;
   processing means for processing, by binary encoding, a target line, said processing means being operable in either a first mode in which the target line is processed by binary encoded in accordance with a predetermined threshold value or in a second mode in which a threshold value is determined in accordance with the peak density level data of at least one line preceding the target line and wherein the target line is processed by binary encoding in accordance with the thus determined threshold value, said processing means performing the determination of said threshold value and the binary encoding processing of the target line, during one time reading operation of the original image by said reading means; and
   selection means for comparing the peak density level data of a line preceding the target line with predetermined density level data and for selecting one the first mode and the second mode in which said processing means processes the target line in accordance with the result of the comparison.

8. An apparatus according to claim 4, wherein said processing means is operable, in the second mode, to predict the peak density level of the target line based on the peak density level of each of a plurality of lines preceding the target line, and to determine the threshold value in accordance with the predicted peak density level.

9. An apparatus according to claim 8, wherein when the predicted peak density level indicates a color lighter than the predetermined density level, said selection means selects the second mode.

10. An apparatus according to claim 8, wherein when the predicted peak density level indicates a color darker than the predetermined density levels, said selection means selects the first mode.

* * * * *

UNITED STATES PATENT AND TRADEMARK OFFICE
CERTIFICATE OF CORRECTION

PATENT NO. : 4,941,188

DATED : July 10, 1990

INVENTOR(S) : Masanori Yamada

Page 1 of 2

It is certified that error appears in the above-identified patent and that said Letters Patent is hereby corrected as shown below: Title page:

[30] At Foreign Application Priority Data:
```
"Dec.  4, 1983 [JP] Japan ....... 58-63013
 Dec.  4, 1983 [JP] Japan ....... 58-63859"
should read
--Apr. 12, 1983 [JP] Japan ....... 58-63013
  Apr. 12, 1983 [JP] Japan ....... 58-63859--.
```

56] At References Cited:
```
U.S. PATENT DOCUMENTS:
"4,594,733  1/1986 Kanzaki et al. .... 358/282"
should read
--4,594,733  6/1986 Kanzaki et al. .... 358/282--.
```

COLUMN 1:

Line 60, "binary" should read --binary encoded.--.

COLUMN 3:

Line 30, "H)" should be deleted.

COLUMN 5:

Line 43, "contant" should read --constant.--

COLUMN 6:

Line 51, "obtained" should read --obtained.--.

UNITED STATES PATENT AND TRADEMARK OFFICE
CERTIFICATE OF CORRECTION

PATENT NO. : 4,941,188

DATED : July 10, 1990

INVENTOR(S) : Masanori Yamada

Page 2 of 2

It is certified that error appears in the above-identified patent and that said Letters Patent is hereby corrected as shown below:

COLUMN 8:

Line 35, "encoded" should read --encoding--.

Line 49, "one" should read --one of--.

Line 53, "claim 4," should read --claim 7,--.

Signed and Sealed this

Fourth Day of August, 1992

Attest:

DOUGLAS B. COMER

*Attesting Officer*   *Acting Commissioner of Patents and Trademarks*